UNITED STATES PATENT OFFICE.

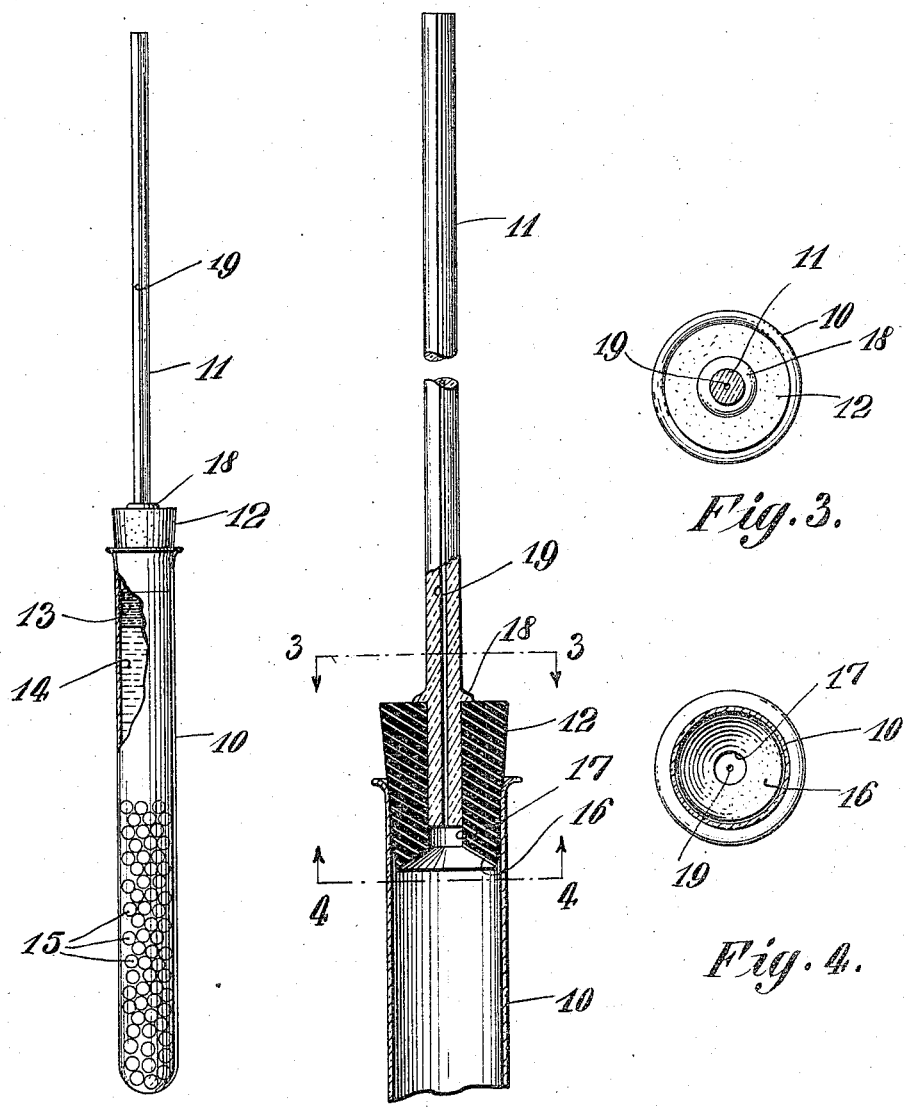

HUGO JONE, OF BROOKLYN, NEW YORK.

MILK-TESTING TUBE.

1,168,644.  Specification of Letters Patent.  Patented Jan. 18, 1916.

Application filed November 9, 1915. Serial No. 60,616.

*To all whom it may concern:*

Be it known that I, HUGO JONE, a citizen of the United States, and a resident of Brooklyn, New York, have invented certain new and useful Improvements in Milk-Testing Tubes, of which the following is a specification.

My invention consists substantially of a milk testing tube which is provided with a capillary tube chiefly for the purpose of separating the air from any oxidizable reagent which may be contained in the testing tube together with the milk to be tested, in the reductase test or in a similar test, the separation to be effective even if the testing tube is inverted for the purpose of re-mixing the cream with the rest of the milk. In addition to the capillary tube means may be provided for the purpose of mixing the contents and for performing other useful functions which are desirable in the reductase test and similar tests.

The new milk testing tube is illustrated by the accompanying drawing.

Referring to the several views of this drawing: Figure 1 is a side elevation of the new testing tube with part of the front wall removed to show the interior. Fig. 2 is a vertical cross section of the upper part of said testing tube on an enlarged scale. Fig. 3 is a horizontal cross section of said testing tube on line 3—3 of Fig. 2, seen in the direction of the arrows. Fig. 4 is a horizontal cross section of said testing tube on line 4—4 of Fig. 2, seen in the direction of the arrows.

The necessity of devising a milk testing tube which would answer the purpose of excluding the air from the mixture of milk and methylene blue solution in the reductase test is apparent from statements which I made in the pamphlet entitled: "*An Easy Test for Bacteria in Milk and Cream, Bärthel's Reductase Test, Improved by Hugo Jone,*" 1915. As this work has been published, there seems to be no need of my describing in detail the errors resulting from admission of air to the mixture. I will however briefly point out the two principal causes of those errors.

The leuco compound formed from the methylene blue by reduction readily takes up oxygen from the air, thereby restoring the methylene blue and prolonging the test beyond the proper duration. The aerobic organisms sometimes get a good chance and sometimes a poor chance to grow in the mixture since the amount of oxygen absorbed by the mixture from the air is not always the same when air is admitted. Under these circumstances it is quite evident that the exclusion of air is most desirable for the purpose of getting correct results. It is also evident that the cream which separates at the top of the liquid has to be re-mixed with the rest of the liquid, since otherwise, the numerous bacteria contained in the cream would not participate in the reduction of the methylene blue for the reason that there is no methylene blue left in the white layer of cream which settles at the top. The duration of the test would therefore be unduly prolonged. To accomplish both purposes, viz: to exclude the air and to permit the re-mixing of the cream with the rest of the liquid, the capillary tube is used.

The test is made as follows: 30.0 cubic centimeters of the well mixed milk and a measured volume of the well preserved methylene blue solution of known strength, generally 4.0 cubic centimeters, are introduced into the testing tube which on the drawing is identified by number 10. Glass beads 15, preferably of globular form and about 6 millimeters in diameter are then allowed to drop into the liquid single or in groups, as may be necessary until the liquid rises to nearly the top of the testing tube. The perforated rubber stopper, 12, with the capillary tube 11, having a bore, 19, of about 1½ millimeters, diameter, inserted in it, is then inserted loosely in the mouth of the testing tube, 10, in such a way that the air in the testing tube, 10, or most of it, escapes through the bore, 19, of the capillary tube, 11, while the testing tube, 10, is closed sufficiently tight to permit the mixing of the contents without any loss of liquid. The mixing of the liquid is accomplished by inverting the testing tube, 10, in such a way that the glass beads drop to the stopper end of the testing tube, then inverting it again to have them drop back, and repeating the operation until they have dropped through the liquid 6 or 8 times. The stopper 12, is to be lifted out of the mouth of the testing tube, 10, if any of the unmixed liquid should have been forced into the bore, 19, of the capillary tube, 11. This is done for the purpose of having such liquid drop back to the remaining liquid in the testing tube, since the loss of any unmixed liquid would make the test inaccurate. After the liquid is thus thoroughly mixed, the stopper, 12, can be inserted more firmly than it was inserted the first time for the reason that the loss of a small amount of the liquid can now no longer do any harm, since it could not, under these circumstances, affect the duration of the test. It is even desirable to insert the stopper the second time with sufficient force to eject a little of the liquid through the bore, 19, of the capillary tube, 11, because in this way the removal of the last remaining air bubbles may be accomplished. The stopper is then raised slightly to have the milk mixture in the bore drop to about the middle of the capillary tube. After the liquid is thus deprived of air and thoroughly mixed, and the height of the liquid in the bore regulated, the test is started by putting the tube in a water bath or air bath or oil bath kept at the temperature of 45° centigrade or 37.5° centigrade or at some other incubating temperature, as may be desired. The cream, 13, which rises at the top is re-mixed with the remaining liquid, 14, every time that it is found to have formed a pale blue or colorless layer of sufficient amount to affect the result of the test. This is continued until the decolorization of the methylene blue is completed, and the time required for it, is determined.

In order to make sure of removing all the air bubbles the rubber stopper, 12, may have a hood shaped cavity, 16, at the bottom, which causes the air bubbles to pass into the pocket 17. This pocket, 17, is formed by inserting the capillary tube, 11, into the hole of the perforated rubber stopper, 12, in such a way that its lower end does not reach the bottom of the rubber stopper, 12, but remains a few millimeters above that bottom or above the cavity, 16, at the bottom. In order to facilitate the proper insertion of the capillary tube into the rubber stopper, 12, the former may be provided with a collar, 18, so it will slip in no farther than to the proper point.

As the reductase test may be made with more or less methylene blue solution than 4 cc., the size of the testing tube may be varied accordingly. It may have a capacity as small as 45 cubic centimeters or as large as 55 cubic centimeters. The former size would be suitable, if only 1 cubic centimeter of methylene blue solution is used, while the latter would be suitable if as much as 10 cubic centimeters are used. In either case, it is understood that the amount of milk used is 30 cubic centimeters. If less milk is taken, for instance 10 cubic centimeters and only one third the amount of the methylene blue solution which would be taken for 30 cubic centimeters of milk, the testing tube may certainly be made correspondingly smaller.

The testing tube is preferably made of highly transparent, colorless glass so the color of the contents can be observed easily.

The capillary tube may be made wholly of transparent glass tubing of 6 millimeters outside diameter and 1½ millimeters inside diameter. It may be 20 centimeters long. If a more durable tube is desired, the outside diameter may be reduced to about 4 millimeters and the tube protected by a frame of metallic nickel, thus resembling in form a miniature protected water gage, suitably inserted in the rubber stopper. The inside diameter of the capillary tube may be decreased to 1 millimeter or it may be increased to 2 millimeters without materially changing the mode of operation. If however, the inside diameter is increased to 3 millimeters, it is desirable to close the open end of the capillary tube with a finger at the moment when the testing tube is inverted for the purpose of mixing the contents, so as to prevent the possible introduction of air into the testing tube. When operating with the ordinary capillary tube of 1½ millimeters diameter, or a still smaller diameter this precaution will be found unnecessary. If the inside diameter is increased much beyond 3 millimeters, a part of the cream, when rising, may settle in the tube and fail to remix with the rest of the liquid when the contents are mixed. As this is not desirable for the reason that the separated cream cannot exercise its full reducing power on the methylene blue in the liquid, unnecesarily large inside diameters are avoided. The length of the capillary tube is subject to considerable variation. It may be decreased to 10 centimeters, more especially if the inside diameter is more than 1½ millimeters. It may be increased to 30 centimeters, more especially if the inside diameter is less than 1½ millimeters.

The collar, 18, may be replaced by three or four small glass cones fused on the capillary tube at the same point, since such glass cones or similar protuberances would prevent the capillary tube from slipping too far into the rubber stopper just as effectively as a collar would.

The outside diameter of the capillary tube can certainly be varied considerably, the object of having a thick tube being merely that of making it durable.

The glass beads, when dropped in one by one evidently offer the advantage that they raise the liquid gradually, not suddenly. The diameter of the glass beads is generally about 3 millimeters. However, it may be as small as 2 millimeters or as large as 8 millimeters. The globular beads are preferred to others, but they may have other forms. Milk white beads are preferred to others, as they show foreign colors better. Shot like balls of nickel or of tin may be substituted for the glass beads if desired.

The rubber stopper may be so shaped that it has a bore like hole in the center or a groove on the side, either one of which would perform the principal functions of the capillary tube. In this way, the insertion of a capillary tube would be rendered unnecessary.

The rubber stopper may be replaced by a cork or by a glass stopper if desired, or it may be omitted altogether and the capillary connected directly with the testing tube.

The testing tube is not to be used exclusively for the ordinary reductase test, but for a number of modifications of that test. For instance, the fermentation of the milk may be omitted. The reductase originally present in the milk sample may be determined by the extent of decolorization effected within a few minutes, and therefore without any material fermentation. The tube may be applied to all cases where the reductase is measured by the decolorization of the methylene blue. The testing tube is also capable of application to heterogeneous liquids other than milk when they contain a substance which is deteriorated by atmospheric oxygen. As such liquids would also separate two or more layers on settling, they may also require to be re-mixed, which could again be done by inverting the testing tube.

Attention is called to the fact that the liquid in the testing tube when it is inverted, is prevented from dropping out not merely by the barometric pressure of the air, but also by capillary attraction, or surface tension. The liquid could certainly be prevented from dropping out of the testing tube by closing it with a glass disk and a screw cap in the same way as the inside tubes of polariscopes are closed. However, as this method requires considerable time and a somewhat complicated apparatus, the method with the capillary tube is decidedly preferred.

The hood shaped cavity at the bottom of the rubber stopper could certainly have a shape other than that of a hood or of a cone and still answer the purpose of causing the air to rise unto the bore of the capillary. Furthermore, by using a beveled stopper and omitting the cavity altogether, a similar effect could be obtained.

The testing tube is certainly not applicable to the determination of the reductase by methylene blue merely, but to its determination by any similar coloring matter as well. Indigo-carmine, safranin, various imido-quinones, indogenid, and other substances which are easily reduced and easily re-oxidized could be substituted for the methylene blue with more or less success. Furthermore, the testing tube may be used in cases where not the reductase, but a similar enzym is to be determined in milk, in fact, it can be used if an entirely different ingredient of the milk is to be determined so long as a reagent is introduced into the milk, in such a test, which is deteriorated by atmospheric oxygen. Likewise the tube may be used for any bacteriological determination involving the cultivation of anaerobic organisms in the absence of atmospheric oxygen.

Claims:

1. A milk testing tube the interior of which is connected with the outside air by a capillary tube inserted in a rubber stopper which, in turn, is inserted in an opening of the testing tube and the bottom surface of which is sloping in such a way that the opening of the capillary bore is the highest point.

2. A milk testing tube the interior of which is connected with the outside air by a capillary tube and which contains glass beads of a milk white color.

3. A milk testing tube containing glass beads and the interior of which is connected with the outside air by a capillary tube inserted in a rubber stopper which, in turn, is inserted in an opening of the testing tube and the bottom surface of which is sloping in such a way that the opening of the capillary bore is the highest point.

4. A milk testing tube containing milk white glass beads and the interior of which is connected with the outside air by a capillary tube inserted in a rubber stopper which, in turn, is inserted in an opening of the testing tube.

HUGO JONE.

Witnesses:
ISABEL LEVINSON,
FRIEDA KICK.

Copies of this patent may be obtained for five cents each, by addressing the "Commissioner of Patents, Washington, D. C."